United States Patent [19]

Leach

[11] Patent Number: 5,660,431
[45] Date of Patent: Aug. 26, 1997

[54] ROCKER CONVERSION FOR LAWN-TYPE CHAIRS

[76] Inventor: Thomas R. Leach, 3625 S. Mohawk Rd., Midway, Tenn. 37809

[21] Appl. No.: 676,532

[22] Filed: Jul. 9, 1996

[51] Int. Cl.$^6$ ............................................. A47C 13/00
[52] U.S. Cl. .................. 297/133; 197/272.1; 403/256; 403/297
[58] Field of Search ................. 297/272.1, 258.1, 297/133; 403/256, 297, 240, 257, 259, 261

[56] References Cited

U.S. PATENT DOCUMENTS

| 145,036 | 11/1873 | Wilcox et al. | 297/133 |
| 304,435 | 9/1884 | Malick | 297/133 |
| 315,369 | 4/1885 | Work | 297/133 |
| 381,878 | 4/1888 | Holman | 297/133 X |
| 1,367,390 | 2/1921 | Hinson | 297/272.1 X |
| 4,126,353 | 11/1978 | Clough | 297/272.1 X |
| 4,318,629 | 3/1982 | Yamamoto | 403/297 |
| 4,938,759 | 7/1990 | Young | 403/297 X |
| 5,138,759 | 8/1992 | Gruetzmacher | 403/297 X |

FOREIGN PATENT DOCUMENTS

| 2014314 | 10/1971 | Germany | 297/272.1 |
| 21800 | 11/1895 | United Kingdom | 403/256 |
| 770335 | 3/1957 | United Kingdom | 403/297 |

*Primary Examiner*—Peter M. Cuomo
*Assistant Examiner*—David E. Allred

[57] ABSTRACT

A rocker conversion unit for affixing rockers to an ordinary molded plastic lawn chair, wherein the unit has an upwardly curved channel shaped rocker the sides of which have an inwardly extending lip providing a first shoulder downwardly facing and adapted to provide a stop for preventing withdrawal of structure upwardly from the channel, a block slidable within the channel and having a second and upwardly facing shoulder extending along each side edge thereof and adapted to engage the first shoulder and be stopped in its upward movement thereby, the block having a height dimension from its bottom to its second shoulder which is less than the base-to-shoulder height dimension of the channel to provide a space in which a lateral foot segment of a molded lawn chair leg can be positioned, and wherein the block further has a manually operable pressure portion adapted to simultaneously force a lower portion of the block downwardly against the foot segment and to force the second shoulder upwardly against the first shoulder whereby the foot segment is rigidly, frictionally locked in position against the bottom of the channel and the rocker is stabilized on the chair.

5 Claims, 2 Drawing Sheets

ROCKER CONVERSION FOR LAWN-TYPE CHAIRS

BACKGROUND OF THE INVENTION

1. Field of the Invention

This invention concerns modern casual or lawn-type chairs, typically of plastic molded construction, and the means for converting them to rocking chairs, wherein the chair legs themselves are of special construction which lends to rapid and structurally stable assembly to complimentary structure of a pair of rockers specially configured in accordance with the present invention.

2. Discussion of Prior Art

Heretofore, variously structured rockers have been proposed for use with conventionally shaped chairs for converting them to rocking chairs. Typical of such rockers are those shown in U.S. Pat. No. 1,367,390; 5,246,268; 264,917; 304,435; and 405,919.

The various types of devices shown in these patents for connecting the chair legs to the rockers have taken the forms which have been found effective for clamping the rockers to the leg ends with considerable lateral forces such as are required to prevent surface-to-surface slippage between the adjacent portions of either the legs and rockers, or between the adjacent portions of the clamping device and rocker or chair leg. Such clamping forces are quite necessary for offsetting the substantial and generally vertically directed forces which normally tend to dislodge the rockers from the chair legs during the rocking cycle.

With the advent of modern plastic molded chairs with their rather flimsy leg constructions, the types of clamping devices as described above cannot afford a satisfactory structurally stable and quick connect and disconnect connecting means between the rockers and the modern chair legs. For example, significant lateral forces applied to the edge of one of the leg sections could easily deform the leg and destroy the connection to the rocker.

OBJECTS OF THE INVENTION

A principal object therefore, of the present invention is to provide specially constructed units of rockers and pressure mechanisms for connecting the relatively weak plastic molded legs of a modern lawn-type chair to said rockers, in a quick connect and disconnect manner.

A further object is to provide said units in lightweight, inexpensive, and easily manufacturable form, which lends to providing the unit in selected dimensions for accommodating a variety of molded chair legs.

SUMMARY OF THE INVENTION

The above and further objects hereinafter becoming evident have been attained in accordance with the present invention thru the discovery of a rocker conversion unit which unit is defined in its broad embodiment as an upwardly curved channel shaped rocker having elongated base means adapted to provide the bottom of said rocker and to contact and rock on a floor or lawn or other supporting surface, first and second side means integrally connected to opposite edges of said base means and extending upwardly therefrom along substantially the full length thereof to provide a generally upwardly opening channel having a longitudinal plane, lip means on the inside surface of each said side means and extending substantially the entire length of said side means adjacent the upper edge portion thereof and directed inwardly toward said plane at a substantially uniform distance above said base means, each said lip means providing a first shoulder means downwardly facing and adapted to provide a stop for preventing withdrawal of structure upwardly from said channel, said channel having a substantially uniform side-to-side width and base-to-shoulder height throughout its length, block means slidable within said channel, a second and upwardly facing shoulder means extending along each side edge of said block means and adapted to engage a first shoulder means and be stopped in its upward movement thereby, said block means having a height dimension from its bottom to its second shoulder means which is less than the base-to-shoulder height dimension of said channel to provide a space in which a lateral foot segment of a molded lawn chair leg can be positioned, and wherein said block means further comprises manually operable pressure means adapted to simultaneously force a lower portion thereof downwardly against said foot segment and to force said second shoulder means thereof upwardly against said first shoulder means whereby said foot segment is rigidly, frictionally locked in position against said base means and said rocker is stabilized on said chair.

In certain preferred embodiments:

(a) said first and second shoulder means are provided with complimentary cam surfaces which tend to pull the upper portions of said channel sides together as said first and second shoulder means are being forced into engagement;

(b) said pressure means comprises screw means threaded substantially vertically thru said block means and having a lower end means for engaging the top of said foot segment and forcing said segment against said base as said screw means is screwed downwardly further thru said block means;

(c) said pressure means comprises wedge means adapted to be driven between an upper surface of said lateral segment of said leg and a bottom surface portion of said block means; and (d) said pressure responsive means comprises a cam pivotally mounted on said block means for angular movement into contact with or away from an upper surface of said lateral segment for tightening or loosening said block means respectively against said segment.

BRIEF DESCRIPTION OF THE DRAWINGS

The invention will be further understood from the accompanying drawings of certain preferred embodiments and description thereof wherein the necessary spacings between portions of the block means and rocker for allowing sliding of the block means within the channel are not shown but are to be understood.

DETAILED DESCRIPTION OF THE DRAWINGS

Figure 1:
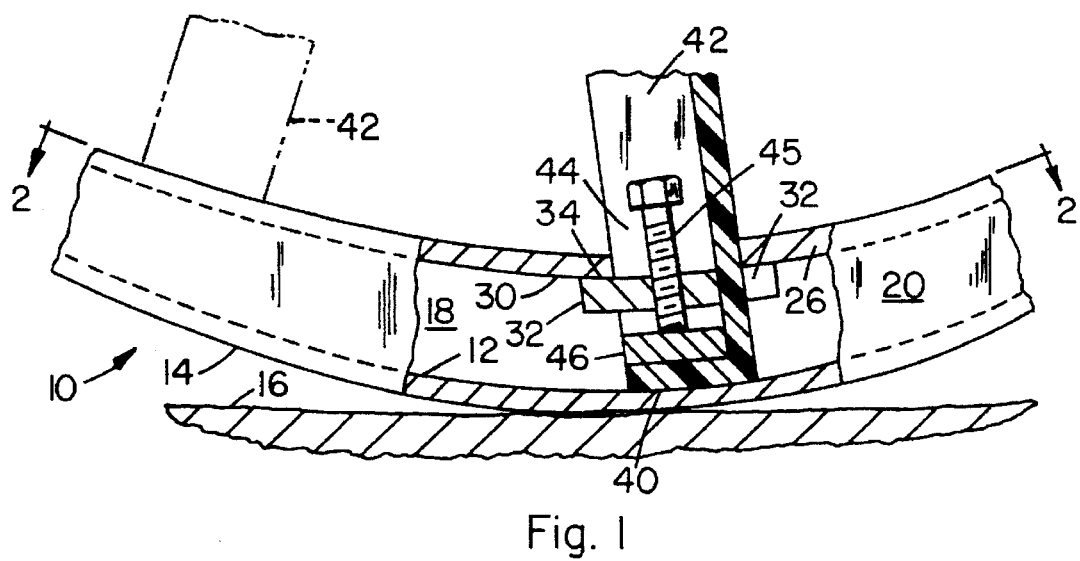
FIG. 1 is a side view of a rocker embodying the present invention, with portions of a molded plastic chair leg secured thereto and portions of the leg and rocker shown in cross-section for clarity.

Referring to the drawings and with particular reference to the claims hereof, the present rocker conversion unit in a broad embodiment comprises an upwardly curved, channel shaped rocker 10 having elongated base means 12 adapted to provide the bottom 14 of said rocker and to contact and rock on a floor 16 or lawn or other supporting surface, first 18 and second 20 side means integrally connected to opposite longitudinal edges of said base means and extending upwardly therefrom along substantially the full length thereof to provide a generally upwardly opening channel 22 a longitudinal plane 24, lip means 26 on the inside surface of each said side means and extending substantially the entire length of said side means adjacent the upper edge portion 28 thereof and directed inwardly toward said plane at a substantially uniform distance above said base means, each said lip means providing a first shoulder means 30 downwardly facing and adapted to provide a stop for preventing withdrawal of structure upwardly from said channel, said channel having a substantially uniform side-to-side width and base-to-shoulder height throughout its length, block means 32 slidable within said channel, a second and upwardly facing shoulder means 34 extending along each side edge of said block means and adapted to engage a first shoulder means 30 and be stopped in its upward movement thereby, said block means having a height dimension from its bottom 36 to its second shoulder means 34 which is less than the base-to-shoulder height dimension of said channel to provide a space 38 in which a lateral foot segment 40 of a molded lawn chair leg 42 can be positioned, and wherein said block means further comprises manually operable pressure means 44 adapted to simultaneously force a lower portion 46 thereof downwardly against said foot segment and to force said second shoulder means thereof upwardly against said first shoulder means whereby said foot segment is rigidly, frictionally locked in position against said base means 12 and said rocker is stabilized on said chair.

Rocker 10 is preferably of heavy molded plastic such as poly (vinyl chloride) (PVC), cellulose acetate butyrate, layered epoxy or polyester resin impregnated fiberglass mat, polyamide, polycarbonate, or the like, or it may be of wood or metal, i.e., aluminum or steel.

Figure 3:
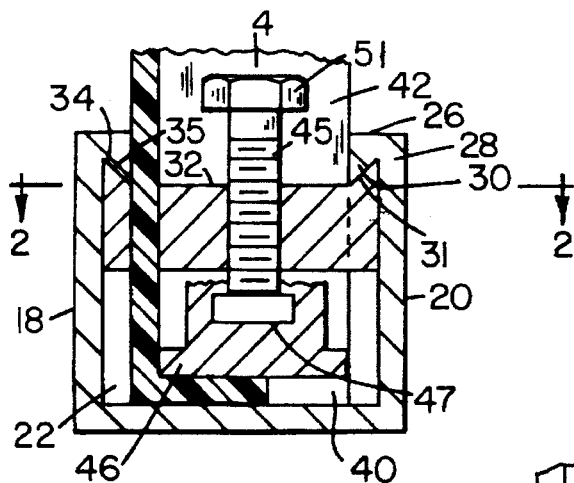
FIG. 3 is a view taken along line 3—3 of FIG. 2 in the direction of the arrows.

In the embodiment of FIG. 3 the lip means 26 are provided on their undersides with outwardly angled first shoulder means 30 which act as first cam surfaces 31. For this embodiment, the second shoulder means 34 on the upper edge portions of block means 32 are inwardly angled to act as complimentary second cam surfaces 35. In operation, block means 32 is forced upwardly by pressure means 44 and as these cam surfaces engage, further upward movement of the block means results in inward gripping movement of upper edge portions 28 of the channel sides toward the chair leg and further stabilizes the rocker on the chair.

Figure 2:
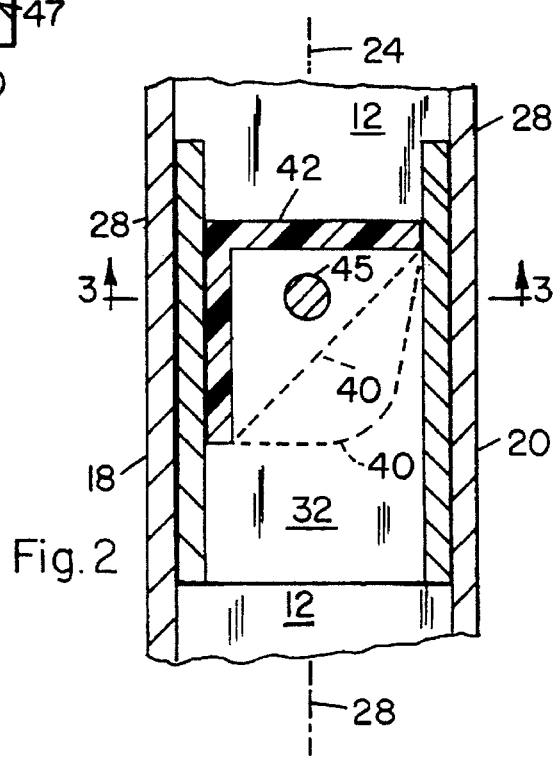
FIG. 2 is a view taken along line 2—2 of FIG. 1 in the direction of the arrows with portions broken away for clarity.

The block means 32 as shown is a preferred configuration, however, any shape thereof may be adopted as long as the cooperation of forces generated by the block means downwardly on the foot segment 40 of the chair leg and upwardly on the underside of the lip means 28 is such that the leg is locked securely in place in the rocker channel. Segment 40 may be of any shape such as the diagonal dotted line 40 or line 40' as shown in FIG. 2.

Figure 5:
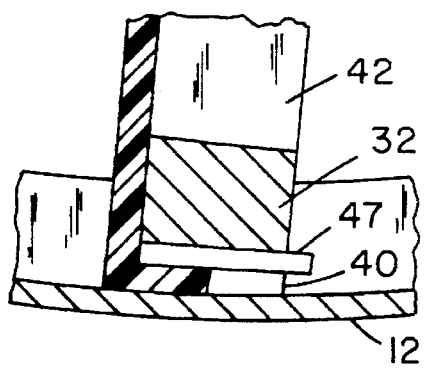
FIG. 5 is a partial view as in FIG. 3 showing a wedge variation of the pressure means.
Figure 8:
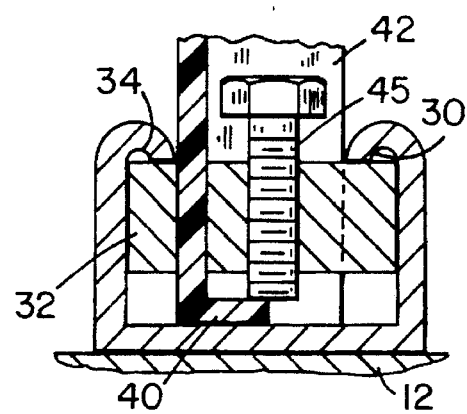
FIG. 8 is a view as in FIG. 3 showing a shape variation of the first and second shoulder means.
Figure 6:
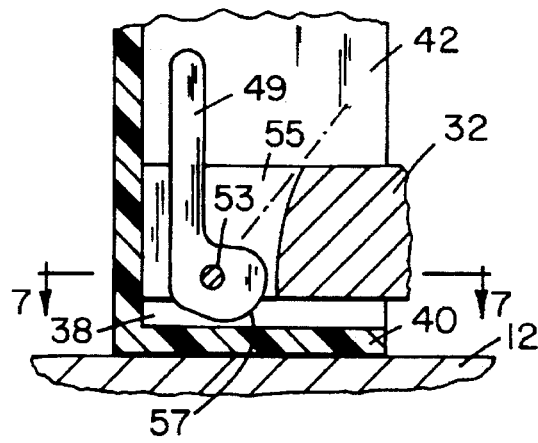
FIG. 6 is a partial view as in FIG. 3 showing a cam variation of the pressure means.
Figure 7:
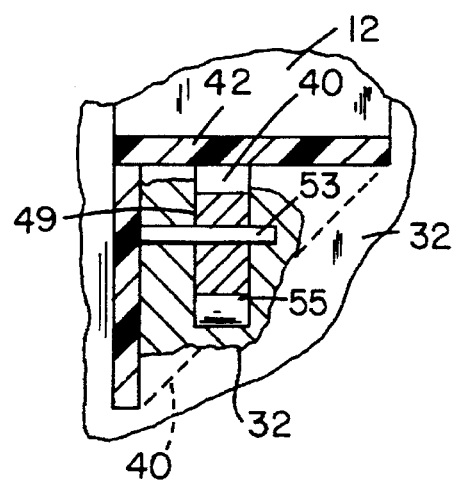
FIG. 7 is a cross-sectional view taken along line 7—7 of FIG. 6 in the direction of the arrows.
Figure 4:
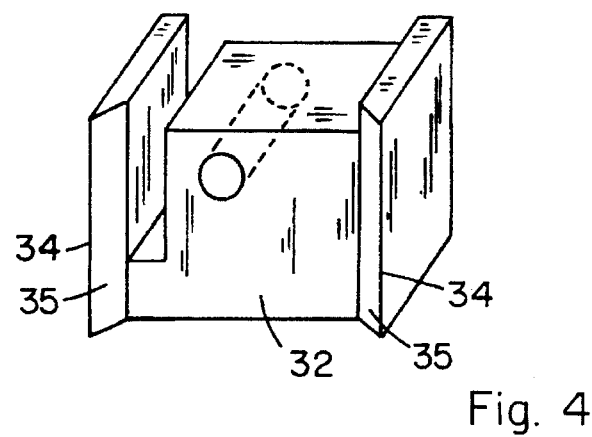
FIG. 4 is an isometric view of the block means of FIGS. 1–3 taken generally in the direction of arrow 4 in FIG. 3.

The pressure means generally designated 44 can be of any type, e.g., the screw type 45 of FIG. 3, the wedge type 47 of FIG. 5 or the cam arm 49 type of FIGS. 6 and 7.

Referring to FIG. 3, the end 47 of screw 45 is rotatably mounted in the lower portion 46 of the block means, which portion is preferably substantially the same dimensions as foot segment 40 for maximizing the uniformity of pressure against the segment and the stability of the leg in the channel. In one preferred embodiment the bottom of portion 46 is roughened, as are shoulders 30 and 34 to positively prevent inopportune slippage of the chair leg in the channel once the block means has been tightened therein. The head 51 of the screw may be of any convenient type such as hex, Phillips, Allen, or wing nut.

Referring to FIGS. 6 and 7, a preferred type of pressure means comprises cam arm 49 which is pivotally mounted on pin 53 secured thru slot 55 in block means 32. The cam surface 57 of arm 49 is forced against foot segment 40 as the arm is rotated clockwise in FIG. 6. Suitable means may be provided for releasably retaining the arm in its tightened position such as the positioning of pin 52 to cause an overcentering of cam surface 57 as shown by the dotted lines in FIG. 6. It is noted that the orientation of the foot segment 40 of the molded plastic chairs for which the present invention is intended can vary, e.g., face longitudinally forwardly as shown in FIG. 2, or face in the reverse thereof. Also, the present unit can be constructed to various dimensions to accommodate various size chair legs.

The present unit is affixed to the chair leg in the embodiment shown very simply and quickly by inserting the two legs of each side of a chair into channel 22 and then sliding the blocks 32 which were previously slid into the channel from the ends of the rocker, into the position as shown in FIG. 2. The screws 45, wedges 47 or cam arms 49 are then actuated to tighten the blocks against the rocker base and against the first shoulder means of the sides 18 and 20. For chairs on which the legs have forwardly and rearwardly facing foot segments, the blocks are slid into the channel from the ends thereof until they are juxtaposed the legs.

The invention has been described in detail with particular reference to preferred embodiments thereof, but it will be understood that variations and modification will be effected with the spirit and scope of the invention.

I claim:

1. A rocker conversion unit for affixing rockers to a molded plastic lawn chair, said unit comprising a pair of upwardly curved channel shaped rockers each having elongated base means adapted to provide the bottom of said rocker and to contact and rock on a floor or lawn or other supporting surface, first and second side means integrally connected to opposite edges of said base means and extending upwardly therefrom along substantially the full length thereof to provide a generally upwardly opening channel bisected by a longitudinal plane, lip means on the inside surface of each said side means and extending substantially the entire length of said side means adjacent the upper edge portion thereof and directed inwardly toward said plane at a substantially uniform distance above said base means, each said lip means providing a first shoulder means downwardly facing and adapted to provide a stop for preventing withdrawal of structure upwardly from said channel, said channel having a substantially uniform side-to-side width and base-to-shoulder height throughout its length, said structure comprising block means slidable within said channel, a second and upwardly facing shoulder means extending along each side edge of said block means and adapted to engage a first shoulder means and be stopped in its upward movement thereby, said block means having a height dimension from its bottom to its second shoulder means which is less than the base- to-shoulder height dimension of said channel to provide a space in which a lateral foot segment of a molded lawn chair leg can be positioned, and wherein said block means further comprises manually operable pressure means adapted to simultaneously force a lower portion of said block means downwardly against said foot segment and to force said second shoulder means thereof upwardly against said first shoulder means whereby said foot segment is rigidly, frictionally locked in position against said base means and said rocker is stabilized on said chair.

2. The unit of claim 1 wherein said first and second shoulder means are provided with complimentary cam surfaces which tend to pull the upper portions of said side means together as said first and second shoulder means are being forced into engagement.

3. The unit of claim 1 wherein said pressure means comprises screw means threaded substantially vertically thru said block means and having a lower end means for engaging an upper surface of said foot segment and forcing said segment against said base as said screw means is screwed downwardly further thru said block means.

4. The unit of claim 1 wherein said pressure means comprises wedge means adapted to be driven between an upper surface of said lateral segment of said leg and a bottom surface portion of said block means.

5. The unit of claim 1 wherein said pressure means comprises a cam pivotally mounted on said block means for angular movement into contact with or away from an upper surface of said lateral segment for tightening or loosening said block means respectively against said segment.

* * * * *